US012801600B2

(12) United States Patent
Wouhaybi et al.

(10) Patent No.: US 12,801,600 B2
(45) Date of Patent: Nov. 17, 2026

(54) SYSTEMS AND METHODS FOR GENERATING AND DEPLOYING SPECIALIZED EXPERT SMALL MODELS

(71) Applicant: SK Hynix NAND Product Solutions Corp., Rancho Cordova, CA (US)

(72) Inventors: Rita H. Wouhaybi, Portland, OR (US); Priyanka Mudgal, Portland, OR (US); Caleb Mcmillan, Forest Grove, OR (US); Samudyatha Kaira, Portland, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 19/000,312

(22) Filed: Dec. 23, 2024

(65) Prior Publication Data

US 2026/0178576 A1 Jun. 25, 2026

(51) Int. Cl.
*G06F 16/2453* (2019.01)
*G06N 3/042* (2023.01)

(52) U.S. Cl.
CPC ......... *G06F 16/2453* (2019.01); *G06N 3/042* (2023.01)

(58) Field of Classification Search
CPC ............................ G06F 16/2453; G06N 3/042
(Continued)

(56) References Cited

U.S. PATENT DOCUMENTS 10,552,737 B2 * 2/2020 Seibold .................... G06F 18/40
12,001,462 B1 * 6/2024 Madisetti ............ G06F 16/3329
(Continued)

FOREIGN PATENT DOCUMENTS

CN 119129746 A * 12/2024 ........... G06F 18/253
CN 120104734 A * 6/2025 ............. G06N 3/082
(Continued)

OTHER PUBLICATIONS

Hadish et al., "Language Models at the Edge: A Survey on Techniques, Challenges, and Applications", the 2nd International Conference on Foundation and Large Language Models (FLLM2024), Nov. 26-29, 2024, Dubai, United Arab Emirates, pp. 262-271. (Year: 2024).*

(Continued)

*Primary Examiner* — Phuong Thao Cao
(74) *Attorney, Agent, or Firm* — Morgan, Lewis & Bockius LLP

(57) ABSTRACT

This application is directed to automatically generating and deploying specialized enterprise artificial intelligence models through intelligent component extraction. The method analyzes enterprise data using natural language processing to understand contextual requirements and generates targeted prompts reflecting the enterprise context. By monitoring neural activation patterns in response to these prompts within a pre-trained large language model, the system identifies the most contextually relevant computational components. The method then extracts these key components using
(Continued)

model reduction techniques, creating a specialized expert model optimized for enterprise use. The resulting streamlined model maintains essential functionality while reducing computational overhead compared to the full language model. When deployed in production environments, these specialized models enable faster query processing and efficient resource utilization while preserving accuracy for domain-specific tasks. This approach creates lightweight, context-aware models that balance performance with computational efficiency.

20 Claims, 8 Drawing Sheets

(58) Field of Classification Search
USPC .......................................................... 707/713
See application file for complete search history.

(56) References Cited

U.S. PATENT DOCUMENTS

| | | | | |
|---|---|---|---|---|
| 12,505,307 | B2 * | 12/2025 | Liu | G06F 16/90332 |
| 12,608,371 | B1 * | 4/2026 | Rabito | G06F 16/243 |
| 2019/0138895 | A1 * | 5/2019 | Jin | G06N 3/08 |
| 2021/0241108 | A1 * | 8/2021 | Chai | H04L 41/16 |
| 2023/0104757 | A1 * | 4/2023 | Pramod | G06N 3/0475 706/11 |
| 2023/0419119 | A1 * | 12/2023 | Lal | G06N 20/20 |
| 2024/0096047 | A1 * | 3/2024 | Farhadi | G06V 20/54 |
| 2024/0160894 | A1 | 5/2024 | Xiong et al. | |
| 2025/0036933 | A1 * | 1/2025 | Liu | G06N 20/00 |
| 2025/0061307 | A1 * | 2/2025 | Tran | G06N 3/045 |
| 2025/0148285 | A1 * | 5/2025 | Nencka | G06N 3/045 |
| 2025/0272541 | A1 * | 8/2025 | Yan | G06N 3/0455 |
| 2025/0335760 | A1 * | 10/2025 | Kalamkar | G06N 20/00 |
| 2026/0023797 | A1 * | 1/2026 | Namin | G06F 16/9535 |
| 2026/0141264 | A1 * | 5/2026 | Nguyen | G06N 5/02 |

FOREIGN PATENT DOCUMENTS

| | | | | | |
|---|---|---|---|---|---|
| KR | 102508886 | B1 | * | 3/2023 | G06N 5/04 |
| KR | 20230097713 | A | * | 7/2023 | G06N 3/096 |
| WO | WO-2023171930 | A1 | * | 9/2023 | G06N 5/04 |
| WO | WO-2025193859 | A1 | * | 9/2025 | G06F 40/56 |

OTHER PUBLICATIONS

SK Hynix NAND Product Solutions Corp. (dba Solidigm), PCT/US2025/061199, International Search Report and Written Opinion, May 12, 2026, 11 pgs.

Difan Jiao et al., "SPIN: Sparsifying and Integrating Internal Neurons in Large Language Models for Text Classification", In *Findings of the Association for Computational Linguistics: ACL 2024*, Bangkok, Thailand. Association for Computational Linguistics, pp. 4666-4682, 17 pgs. https://aclanthology.org/2024.findings-acl.277/.

Junmo Kang et al., "Self-MoE: Towards Compositional Large Language Models with Self-Specialized Experts", International Conference on Learning Representations 2025 (ICLR 2025), Oct. 2024 [retrieved on Apr. 20, 2026], 24 pgs. Retrieved from https://arxiv.org/abs/2406.12034v2.

Long Ouyang et al., "Training language models to follow instructions with human feedback", Advances in Neural Information Processing Systems 35 (NeurIPS 2022), Mar. 2022 [retrieved on Apr. 20, 2026], 15 pgs. Retrieved from https://arxiv.org/abs/2203.021_55v1.

* cited by examiner

SYSTEMS AND METHODS FOR GENERATING AND DEPLOYING SPECIALIZED EXPERT SMALL MODELS

BACKGROUND

Large Language Models (LLMs) have demonstrated remarkable capabilities across diverse applications, driving significant interest from enterprises seeking to leverage this technology for their specific needs. Despite their impressive performance, several critical challenges persist in their widespread adoption. These challenges include the occurrence of hallucinations (incorrect or nonsensical outputs), substantial computational requirements due to model size, significant operational costs, and difficulties in adapting these models to enterprise-specific knowledge domains.

In response to these challenges, there has been a growing trend toward developing smaller, more focused models, often referred to as Specialized Language Models (SLMs) or expert models. These specialized models are designed to excel in specific domains while requiring fewer computational resources than their larger counterparts. This approach has gained particular traction in enterprise environments where domain expertise and computational efficiency are paramount. The development of expert models traditionally involves extensive training on domain-specific datasets. Even generalized models, such as ChatGPT, often incorporate specialized components that focus on particular domains or clusters of related domains. However, the creation of such specialized models from scratch presents significant challenges, including the need for lengthy training periods and the collection of suitable domain-specific training data.

A persistent challenge in LLM applications is the phenomenon of hallucination, where models generate incorrect or contextually inappropriate responses. Hallucination often arises from ambiguous terms having multiple meanings across different contexts, leading to the activation of inappropriate knowledge domains within the model. In enterprise settings, where accuracy and reliability are crucial, such hallucinations can significantly impact the practical utility of these systems. While expert models offer promising solutions to these challenges through their focused scope and reduced computational footprint, their traditional development process remains resource-intensive and time-consuming. This creates a need for more efficient methods of generating specialized expert models that can leverage existing pre-trained LLMs while maintaining accuracy and reliability for specific enterprise use cases.

SUMMARY

Accordingly, there is a need for systems and methods that address at least some of the problems described above. The present disclosure describes systems and methods for efficiently generating specialized expert models from pre-trained large language models (LLMs) using enterprise-specific data. By analyzing enterprise data through natural language processing techniques, the system detects contextual patterns and subject matter domains specific to the organization. These patterns are then used to probe the LLM through carefully generated prompts, enabling the identification and extraction of relevant computational components where domain-specific knowledge is concentrated. The system monitors neural network activation patterns to isolate the most pertinent subset of the LLM's architecture, which is then extracted using model reduction techniques to create a specialized expert model. This approach significantly reduces computational requirements while maintaining accuracy for enterprise-specific tasks. The system implements continuous learning mechanisms to refine model selection and performance, enabling adaptive improvement based on real-world usage patterns. This methodology addresses the challenges of traditional expert model development by leveraging existing LLM capabilities while providing a more efficient path to specialized enterprise artificial intelligence (AI) deployment.

The systems and methods described herein address the fundamental technical challenge of efficiently deploying large-scale AI models in enterprise environments by introducing novel techniques for computational component identification and extraction. The techniques described herein tackle the complex technical problem of identifying and isolating relevant neural pathways within massive language models. This is a task that involves the analysis of millions of interconnected computational nodes and their activation patterns. The solutions described herein provide concrete technical improvements to AI model deployment through automated monitoring and analysis of neural network activation patterns, precise extraction of relevant computational components, and dynamic model reduction techniques that maintain functional integrity while significantly reducing computational overhead. These improvements are realized through specialized computer-implemented processes that analyze enterprise data at scale, monitor complex neural network behaviors, and perform sophisticated model surgery operations that would be impossible to execute manually. The techniques described herein integrate these technical advances into a practical application that demonstrably improves computing system performance by reducing computational resource requirements, accelerating query response times, and optimizing memory usage in enterprise AI deployments while maintaining model accuracy through continuous learning mechanisms.

In one aspect, a method is provided for automatically generating and deploying computationally efficient specialized expert models for enterprise use. The method includes obtaining input data, analyzing the input data to detect context of the input data, generating a set of context-specific prompts based on the analyzed input data, and applying a large language model (LLM) to process the set of context-specific prompts. The LLM includes a plurality of computational components. The method further includes monitoring performance of the plurality of computational components of the LLM in response to the set of context-specific prompts to identify a subset of computational components that are the most relevant to the context of the input data among the plurality of computational components. The method further includes generating a specialized expert model based on the subset of computational components of the LLM and deploying the specialized expert model for processing one or more incoming queries associated with the context of the input data.

In one aspect, a method is provided for automatically generating and deploying computationally efficient specialized expert models for enterprise use. The method includes analyzing enterprise-specific data using natural language processing techniques to detect context and subject matter. The method also includes generating context-specific prompts based on the analyzed data using a prompt generation algorithm and inputting these prompts to a pre-trained large language model (LLM). The method also includes monitoring activation patterns within computational components of the LLM in response to the input prompts and identifying a subset of computational components most relevant to the detected context based on the observed activation patterns. The method also includes extracting the identified subset from the LLM using model reduction techniques to create a specialized expert model with reduced computational requirements compared to the full LLM. The method also includes deploying the specialized expert model in a runtime environment to handle enterprise-specific queries. The deployed specialized expert model provides faster query response times and reduced computational resource usage compared to the full pre-trained LLM while maintaining a threshold level of accuracy for the enterprise-specific context.

In some embodiments, the method further includes monitoring activations of different computational components, and calculating relevance scores for different components based on frequency and intensity of activation. Components are selected as candidates for expert models based on their relevance scores. Relevance can be determined by using prompts and watching for regions of the LLM getting activated.

In some embodiments, identifying the subset includes determining whether activated components represent new or existing expert knowledge, adding newly identified components to a list of potential expert model components, and increasing relevance scores for previously identified components.

In some embodiments, the method further includes implementing a continuous learning mechanism that routes queries to the full LLM, comparing responses between specialized and full models, and updating the specialized model based on this comparison.

In some embodiments, the method further includes routing incoming queries to specialized expert models and/or the full LLM, based on detected context, and aggregating responses when multiple models are invoked for a single query.

In some embodiments, the method further includes collecting user feedback on responses, aggregating feedback data to assess performance, and providing the aggregated feedback data to improve the foundation LLM and/or the specialized expert model, in subsequent iterations.

In some embodiments, analyzing enterprise-specific data includes creating vector representations from the data using an embedding technique, and using these representations to represent the context.

In some embodiments, the method includes creating vector representations (e.g., embeddings) from enterprise data, clustering the vector representations to identify distinct knowledge domains, generating representative prompts for each domain, probing the LLM to identify relevant expert knowledge, creating specialized expert models for each domain, and updating these models by comparing new data vectors to existing domain representations.

In some embodiments, the method includes creating vector representations (e.g., embeddings) for incoming queries, comparing the vector representations to representations characteristic of each specialized expert model, routing queries to models with highest representation similarity (e.g., the similarity computed for the embeddings), and periodically updating the characteristic representations based on successfully processed queries.

In some embodiments, the method includes periodically re-evaluating the relevance and performance of specialized expert models, adjusting their deployment, and updating them or creating new ones in response to changes in enterprise data or query patterns.

In some embodiments, the method includes dynamically creating additional specialized expert models or modifying existing ones based on evolving enterprise needs and query patterns.

In some embodiments, extracting the identified subset includes applying model reduction techniques to remove less frequently activated components, thereby creating a smaller, specialized model focused on relevant expert knowledge.

In some embodiments, the method includes implementing a fallback mechanism to route queries to the full LLM when the specialized model's confidence is below a threshold, query context does not match any specialized model, or multiple models are required for a comprehensive response.

In some embodiments, the method includes identifying multiple relevant specialized expert models for a given context and extracting and combining multiple models when the context requires knowledge from multiple domains.

In some embodiments, the pre-trained LLM comprises multiple functional units, and identifying the relevant subset includes determining the units most frequently activated by generated prompts and selecting units with activation frequencies above a predetermined threshold.

In some embodiments, the method implements a continuous learning mechanism that collects user feedback, aggregates the feedback to assess performance, periodically updates the specialized model, and provides performance data to improve the pre-trained LLM.

In some embodiments, monitoring portions of the LLM includes monitoring computational activity in different components and tracking frequency and intensity of activations in each component.

In another aspect, a computing system includes one or more processors, memory, and one or more programs stored in the memory. The programs are configured for execution by the one or more processors. The programs include instructions for performing any of the methods described herein.

In another aspect, a non-transitory computer readable storage medium stores one or more programs configured for execution by one or more processors of a computing system. The programs include instructions for performing any of the methods described herein.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Disclosed embodiments enable generation and deployment of specialized expert small Models. Systems, methods and devices implementing the techniques in accordance with some embodiments are illustrated in FIGS. 1-4.

Large Language Models (LLMs) have demonstrated impressive capabilities but face challenges in enterprise deployments, particularly around computational efficiency and accuracy. While techniques like Retrieval Augmented Generation (RAG) help integrate enterprise-specific knowledge, they still rely on full-sized LLMs that require substantial computing resources and can produce hallucinations. The present disclosure describes a novel approach that automatically generates specialized expert models from pre-trained LLMs by analyzing enterprise data to identify relevant computational components. By extracting and combining these components into focused expert models, the system achieves both reduced resource requirements and improved accuracy through domain specialization. The system described in this invention enables the automated creation and deployment of specialized expert models by analyzing enterprise data, monitoring neural network activation patterns, and extracting relevant components from foundation LLMs. This approach provides a more efficient alternative to traditional RAG implementations while maintaining the benefits of domain expertise and reducing the likelihood of hallucinations through targeted model specialization.

This patent application includes examples with specific numerical values to illustrate certain embodiments of the invention. These values are provided solely for illustrative purposes and are neither exhaustive nor restrictive. Their purpose is to aid in understanding the invention and its potential applications. Accordingly, the scope of the invention is not confined to the disclosed numerical values but extends to variations, modifications, interpolations, derivations, and equivalents that would be reasonable to those skilled in the art.

Figure 1:
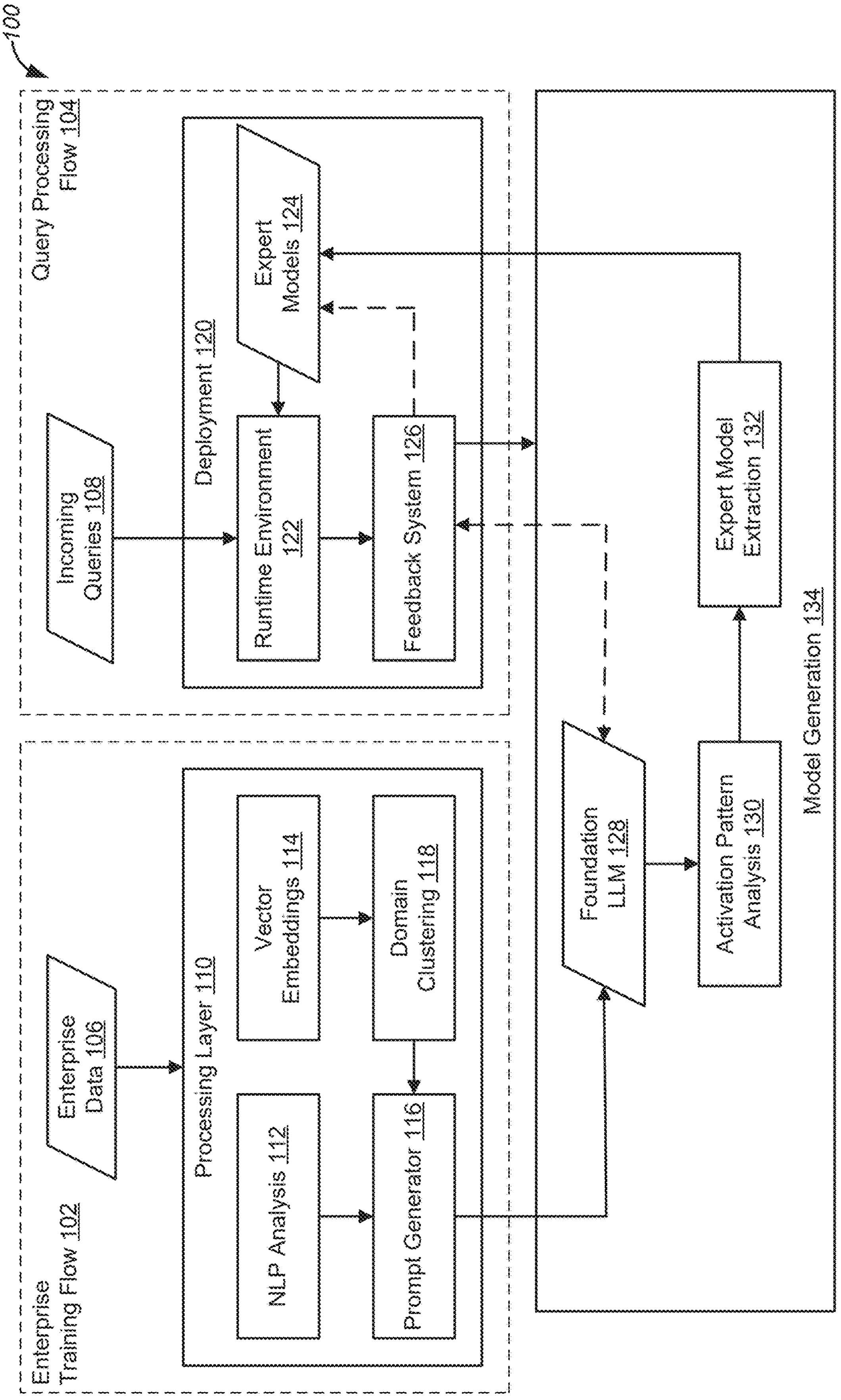
FIG. 1 is a schematic diagram of an example system for generating and deploying specialized expert models, according to some embodiments.

FIG. 1 is a schematic diagram of an example system 100 for generating and deploying specialized expert models, according to some embodiments. In an enterprise training flow 102, enterprise data 106 is processed by natural language processing (NLP) analysis 112, output of which is processed by a prompt generator 116 that generates prompts for model generation 134. In some embodiments, the enterprise data 106 is also processed by vector embeddings 114. The vector embeddings are clustered by domain clustering 118 to obtain clusters, which are also used by the prompt generator 116 to generate prompts. The prompts from the processing layer 110 are input to a foundation LLM in the model generation 134 to generate output. The output of the foundation LLM 128 is analyzed by activation pattern analysis 130. The analysis output is used for expert model extraction 132 to extract expert models 124 for deployment 120. In a query processing flow 104, incoming queries 108 are input to a runtime environment 122 in a deployment layer 120, which routes the queries to appropriate models of the expert models 124 to generate responses. In some embodiments, the output of the runtime environment 122 is input to a feedback system 126, which generates feedback for improving the model generation 134. In some embodiments, the output of the feedback system 126 is input to the foundation LLM 128.

Figure 2A:
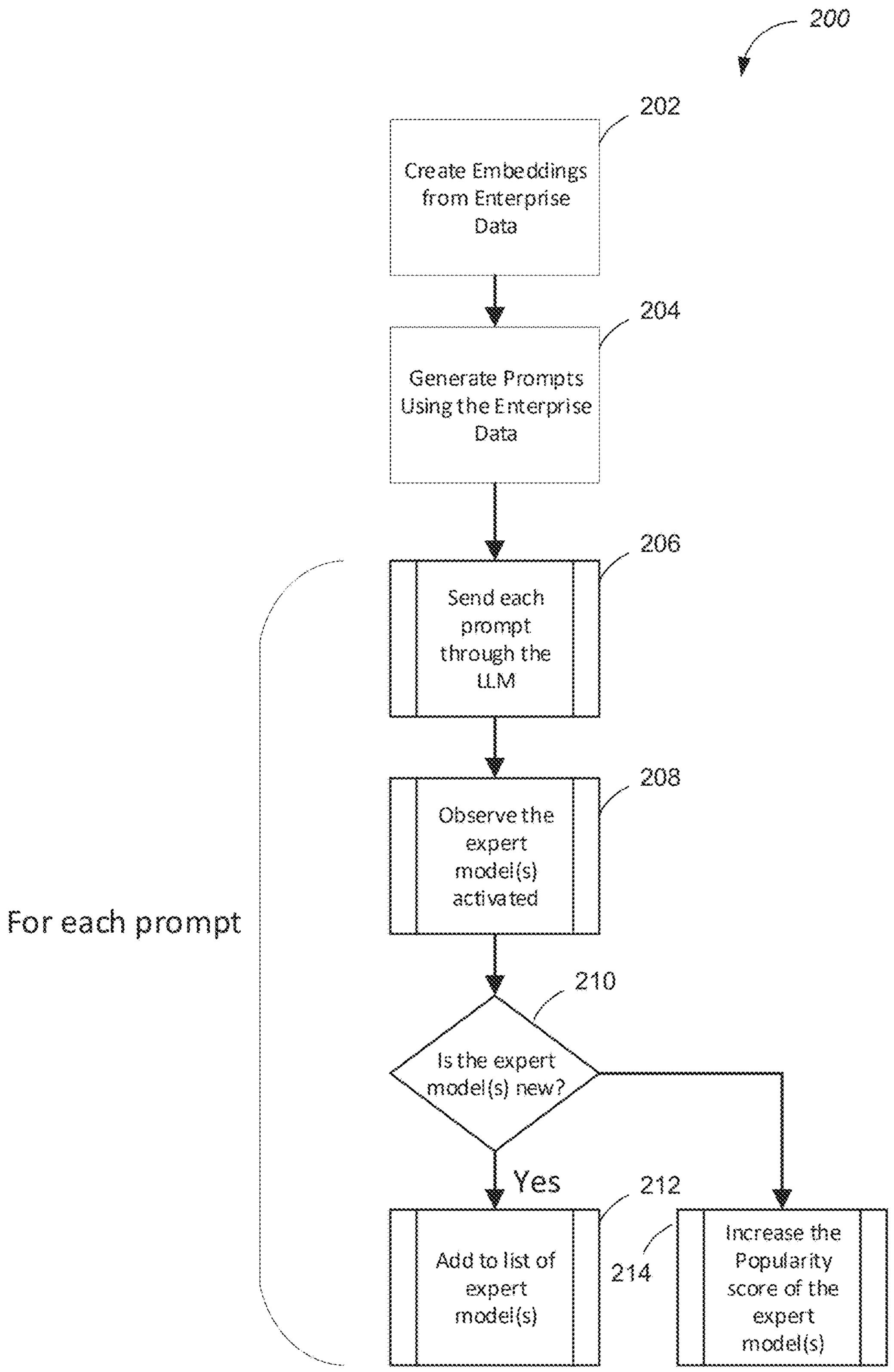
FIG. 2A shows a flowchart of an example process for identifying expert models for an enterprise use case, according to some embodiments.

FIG. 2A shows a flowchart of an example process 200 for identifying expert models for an enterprise use case, according to some embodiments. The process begins with creating (202) embeddings from enterprise data (e.g., the enterprise data 106), followed by generating (204) prompts using the embeddings. These prompts are then input (206) to an LLM, allowing for observation (208) of activated expert models 208. The system 100 evaluates (210) whether identified expert models are new, adding (212) the models to a list if they are new, or increasing (214) popularity score of the models if they are existing models.

Figure 2B:
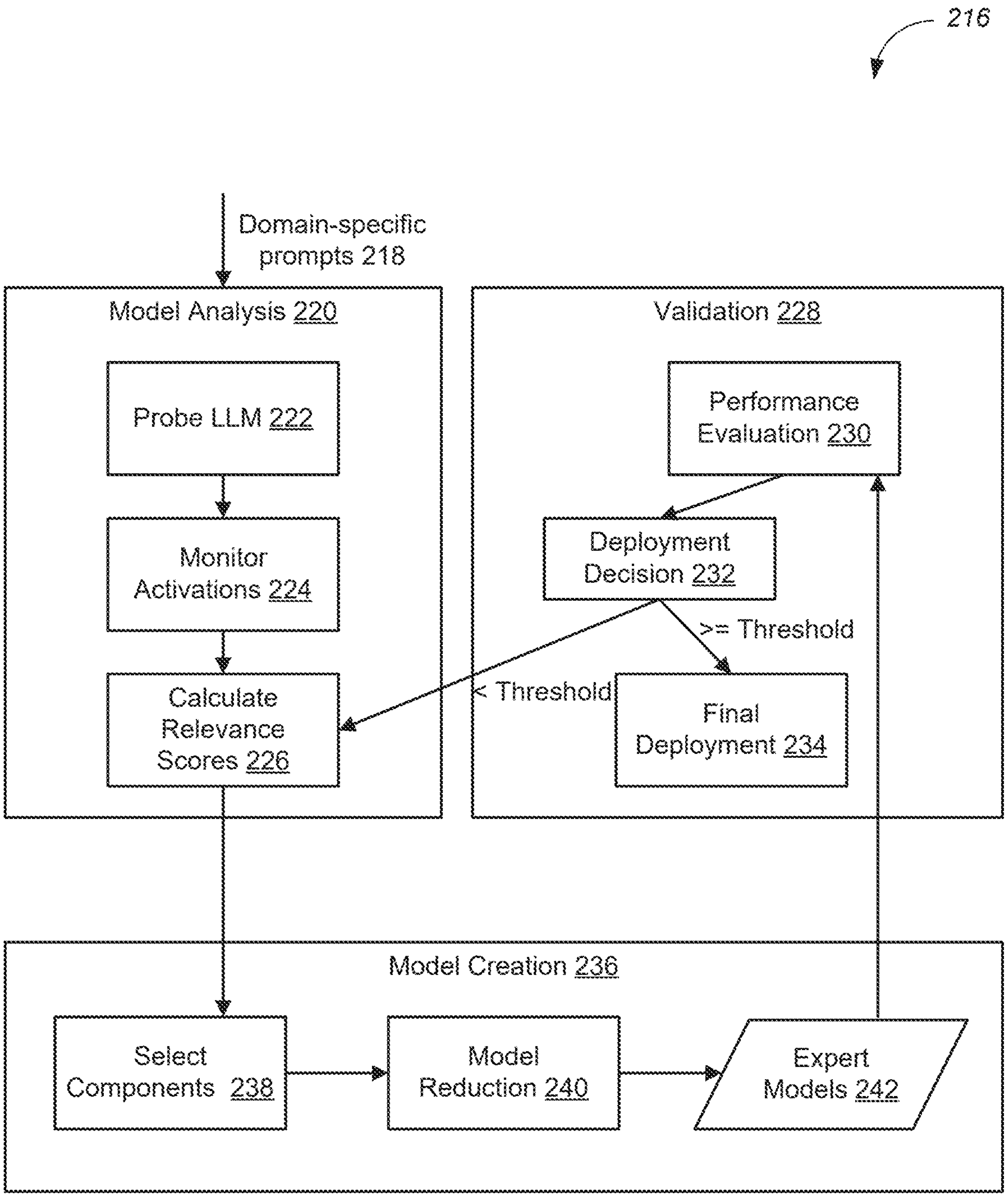
FIG. 2B is a schematic diagram of an example expert model creation process, according to some embodiments.

FIG. 2B is a schematic diagram of an example expert model creation process 216, according to some embodiments. The process begins with domain-specific prompts 218 processed by model analysis 220. The domain specific prompts are input to an LLM by probe LLM 222. The activations of the LLM are monitored 224. The activations are used to calculate relevance scores 226. The relevance scores are subsequently used for model creation 236. The relevance scores are used to select components 238, for model reduction 240, to obtain expert models 242. In some embodiments, the model creation process includes validation 228, which includes performance evaluation 230 followed by deployment decision 232. If performance of the expert models exceeds a predetermined threshold, the models are used for final deployment 234. If the performance falls below the threshold, relevance score calculation 226 followed by model creation 236 is repeated.

Figure 2C:
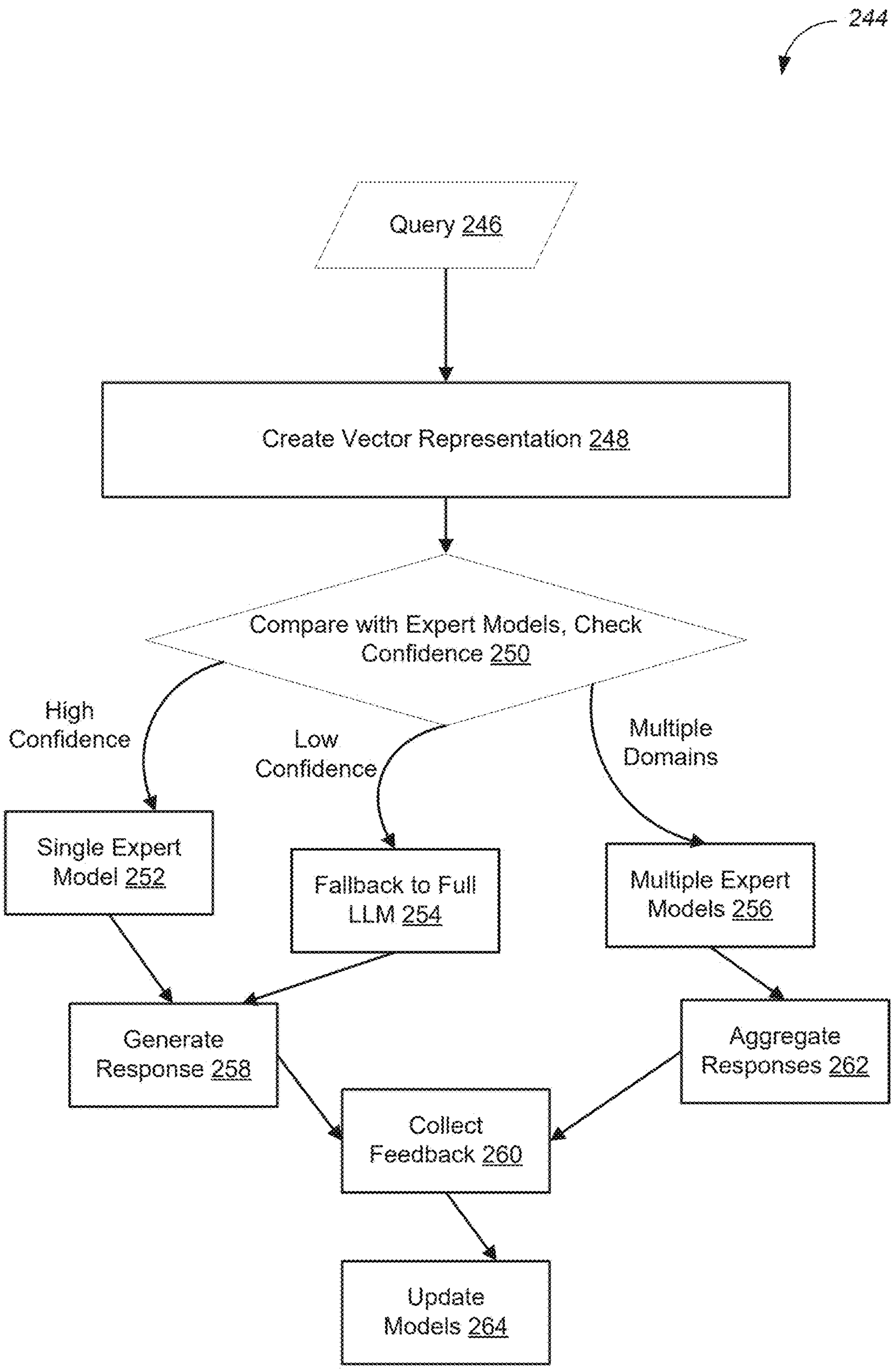
FIG. 2C is a schematic diagram of an example query routing and processing workflow, according to some embodiments.

FIG. 2C is a schematic diagram of an example query routing and processing workflow 244, according to some embodiments. The workflow starts with a query 246 used to create vector representations 248. The system compares (250) the vector representations with expert models and checks confidence levels, leading to one of three paths: routing to a single expert model 252, falling back to the full LLM 254, or engaging multiple expert models 256. Response generation 258 follows the paths for the single expert model 252 and the fallback to full LLM 254. For the multiple domains, multiple expert models 256 are used to aggregate responses 262. Either the response generation 258 or the aggregated responses 262 are used to collect feedback 260, which is used to update models 264.

Figure 2D:
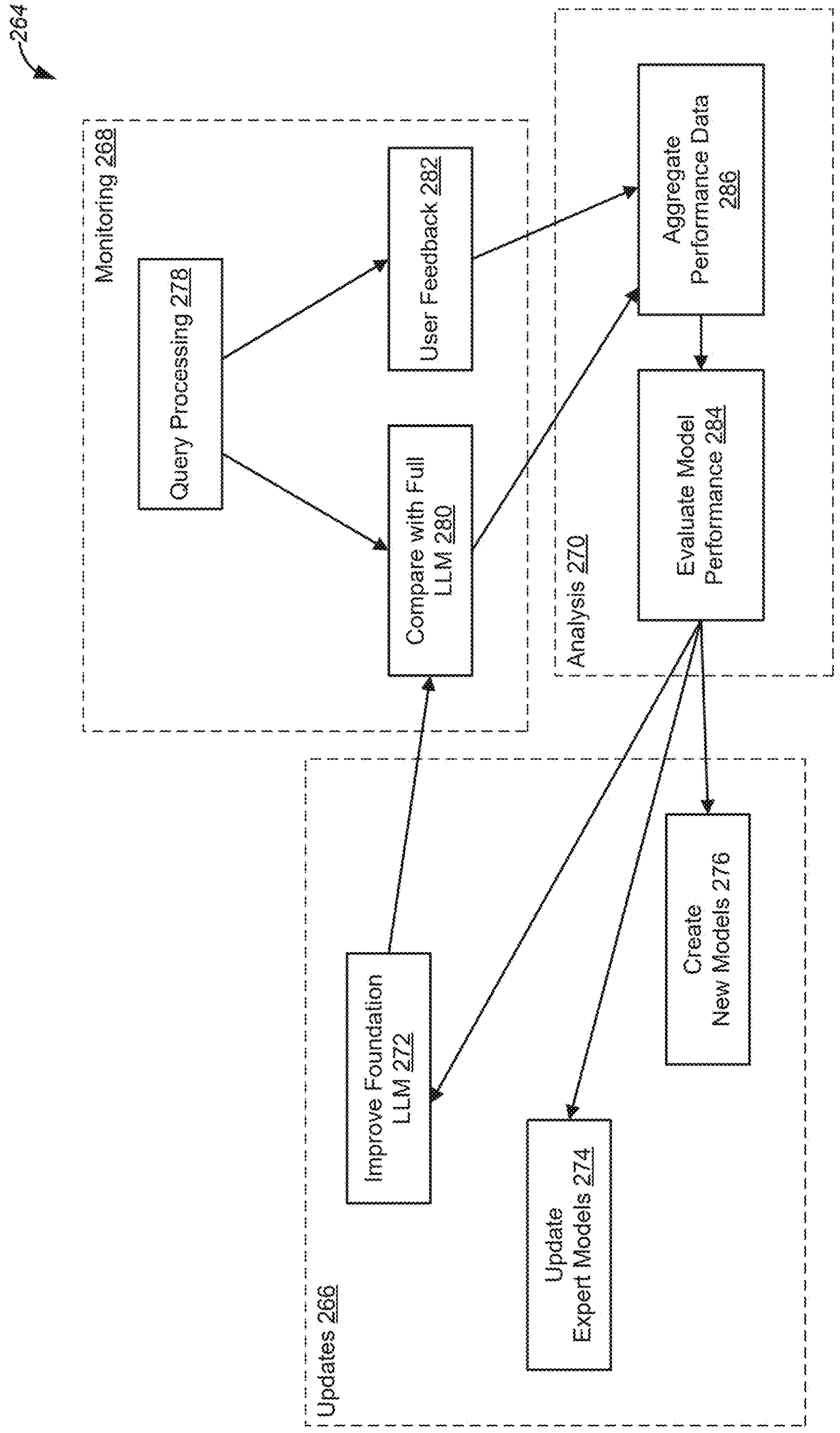
FIG. 2D is a schematic diagram of an example continuous learning system, according to some embodiments.

FIG. 2D is a schematic diagram of an example continuous learning system 264, according to some embodiments. In a monitoring phase 268, query processing 278 is followed by comparison with full LLM 280 and (optionally) user feedback 282, output of either or both of which are used for analysis 280, for aggregating performance data 286 to evaluate model performance 284, depending on which, the system 100, during an update phase 266, improves the foundation LLM 272, updates expert models 274, and/or creates new models 276. The improved foundation LLM 272 may be used for future comparison with the full LLM 280. The system continuously evaluates model performance 284 and aggregates performance data 286 to maintain and improve system effectiveness.

FIGS. 1-2D illustrate a comprehensive system for automatically generating, deploying, and maintaining specialized expert models derived from a foundation LLM. The figures demonstrate the system's ability to process enterprise data, create and manage expert models, handle queries efficiently, and maintain performance through continuous learning and adaptation. The illustrated components and workflows support the goal of providing faster query response times and reduced computational resource usage while maintaining accuracy for enterprise-specific contexts.

Figure 3:
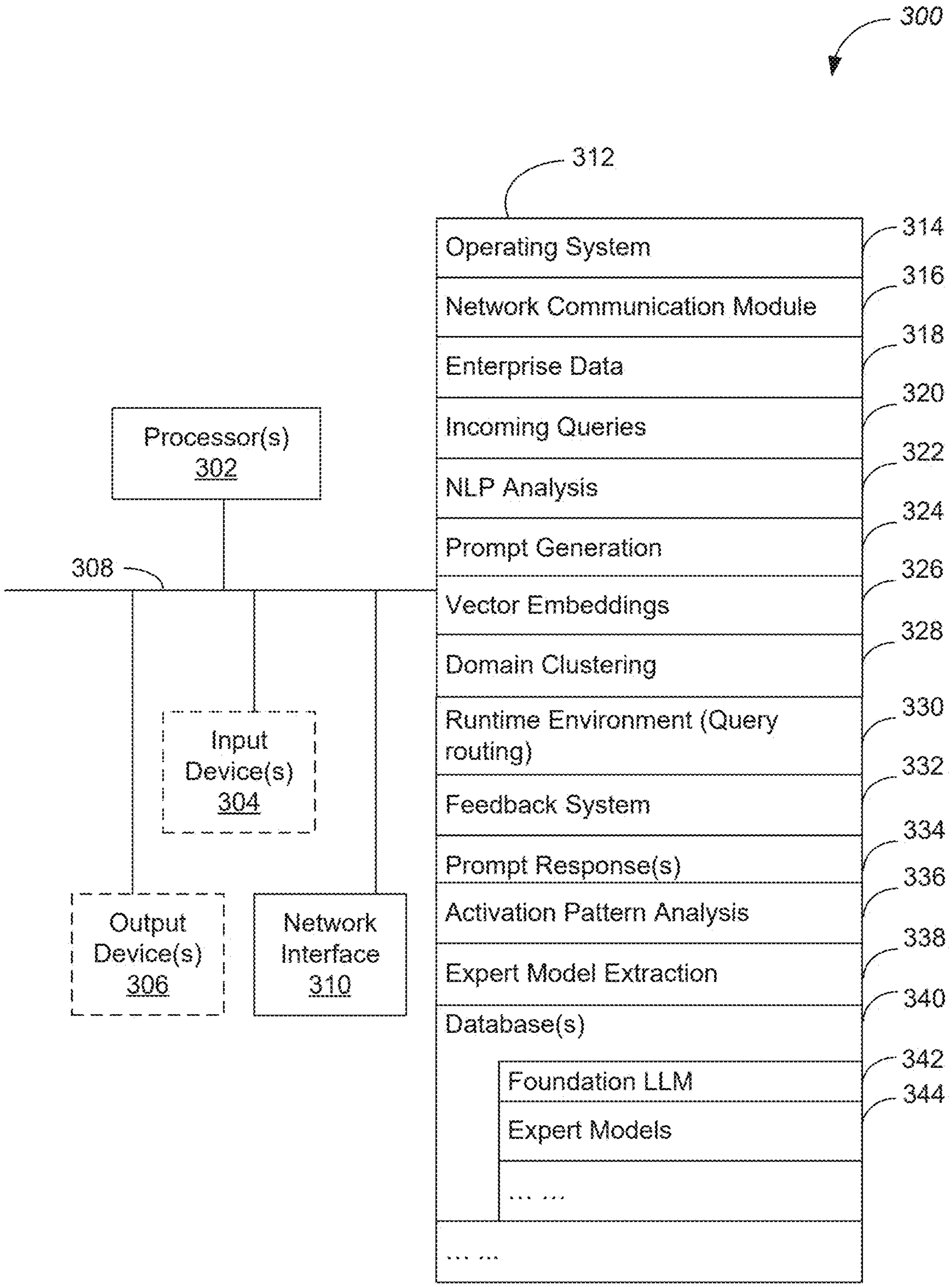
FIG. 3 shows a block diagram of an example computing device for generating and deploying computationally efficient specialized expert models for enterprise use, according to some embodiments.

FIG. 3 shows a block diagram of an example computing device 300 for generating and deploying computationally efficient specialized expert models for enterprise use, according to some embodiments. The computing device 300 includes one or more processors 302 for executing instructions and processing data. These may include CPUs, GPUs, and/or specialized processors for tasks like image processing. The computing device 300 also includes a memory 312, a storage for data and instructions, which may include high-speed random access memory and non-volatile storage like flash memory or solid-state drives. The computing device 300 also includes a communication bus 308, which may include one or more interconnects connecting the various hardware components, allowing data transfer between them. The computing device 200 may also include communication interface(s) 310, which enable network connectivity, potentially including Wi-Fi, Bluetooth, or wired connections for data transfer and API communications. The computing device 300 may also include input devices 304 shown as an optional component (dashed lines), which may include controllers, hand-tracking sensors, and/or other mechanisms for user interaction. The computing device 300 may also include one or more output devices 306 (e.g., a display). The computing device 300 may also include power supply, for providing power to the system, which may be a battery for portable use or a connection to a main power.

In some embodiments, the memory 312 includes high-speed random access memory, such as DRAM, SRAM, DDR RAM, and/or other random access solid state memory devices. In some embodiments, the memory 312 includes non-volatile memory, such as one or more magnetic disk storage devices, optical disk storage devices, flash memory devices, or other non-volatile solid state storage devices. In some embodiments, the memory 312 includes one or more storage devices remotely located from the processor(s) 302. The memory 312, or alternatively the non-volatile memory device(s) within the memory 312, comprises a computer readable storage medium. Memory for headsets include, for example, Random Access Memory (RAM), such as Low Power Double Data Rate RAM (LPDDR), used for running the operating system, applications, and/or handling real-time data processing. Memory 312 may also include storage memory, such as flash memory, similar to smartphones (e.g., eMMC or UFS), for storing the operating system, applications, and/or user data. Video memory, often integrated with the GPU in mobile chipsets, can be used to handle graphics processing tasks. Cache memory, such as Static RAM (SRAM), can be used for high-speed memory used by the processors 312 for data access.

In some implementations, the memory 312 stores one or more programs (e.g., sets of instructions), and/or data structures, collectively referred to as "modules" herein. In some implementations, the memory 312, or the non-transitory computer readable storage medium of the memory 312, stores the following programs, modules, and data structures, or a subset or superset thereof:

- on operating system 314, which manages system resources and/or processes, and/or provide a platform for other software components;
- a network communications module 316, which handles network communications, may be using protocols suitable for real-time data exchange;
- enterprise data 318 (e.g., the enterprise data 106);
- incoming queries 320 (e.g., the incoming queries 108);
- an NLP analysis module 322 (e.g., the NLP analysis 112);
- a prompt generation module 324 (e.g., the prompt generator 116);
- a vector embeddings generation module 326 (e.g., the vector embeddings 114);
- a domain clustering module 328 (e.g., the domain clustering 118);
- a runtime environment 330 (e.g., the runtime environment 122);
- a feedback system 332 (e.g., the feedback system 126);
- prompt responses 334 (e.g., generated responses 258, aggregated responses 262);
- an activation pattern analysis module 336 (e.g., the activation pattern analysis 130);
- an expert model extraction module 338 (e.g., the expert model extraction 132); and/or
- databases 340, which include foundation LLMs 342 (e.g., the foundation LLM 128), and expert models 344 (e.g., the expert models 124).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some embodiments, the memory 312 stores a subset of the modules and data structures identified above. Furthermore, in some embodiments, the memory 312 stores additional modules or data structures not described above. Example details and/or operations of the modules, data structures, applications and/or procedures, are further described below, according to some embodiments. Although FIG. 3 shows a computing device, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
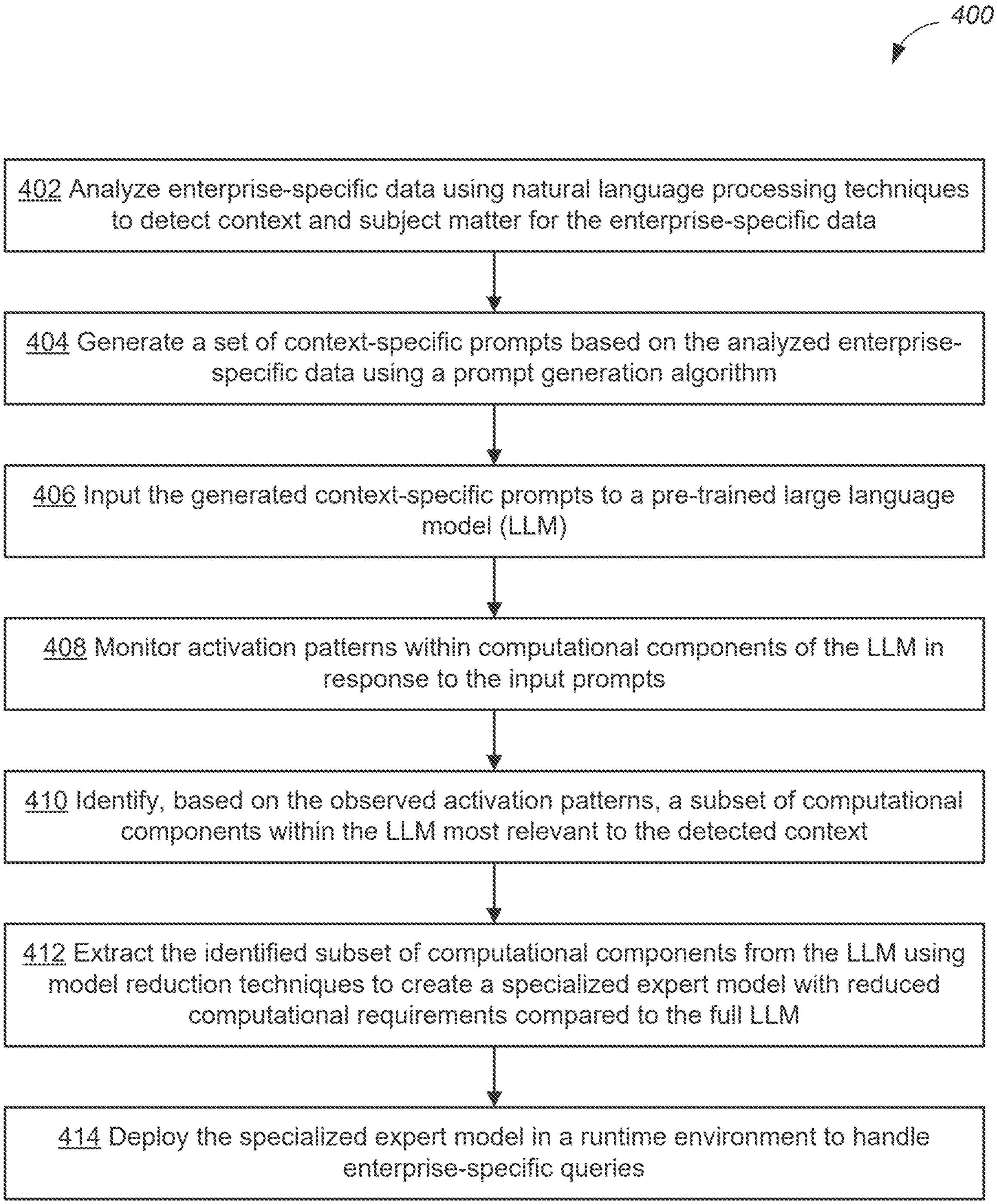
FIG. 4 is a flowchart of an example method for generating and deploying computationally efficient specialized expert models for enterprise use, according to some embodiments.

FIG. 4 is a flowchart of an example method 400 for generating and deploying computationally efficient specialized expert models for enterprise use, according to some embodiments. The method 400 can be performed by the computing system 300. The computing device 300, through its processor(s) 302 and memory 312, executes a method for efficiently deploying large-scale AI models in enterprise environments.

The NLP analysis module 322 analyzes (402) enterprise data 318 (e.g., manuals and documents) using natural language processing to detect context and subject matter. In some embodiments, the vector embeddings generation module 326 creates vector representations from the enterprise data 318 using an embedding technique and uses these representations to represent the context. The domain clustering module 328 clusters the embeddings to identify distinct knowledge domains. In some embodiments, the domain clustering module 328 uses standard clustering algorithms, such as k-nearest neighbors (KNN) to group similar vector embeddings and identify distinct knowledge domains within the enterprise data. The boundaries between domains are empirically determined during the training phase by testing multiple clustering configurations, with parameters like the number of clusters and distance thresholds adjusted to optimize the separation between different areas of expertise. This iterative approach allows the system to find natural groupings in the enterprise data that can inform the creation of specialized expert models.

The prompt generation module 324 generates (404) context-specific prompts based on the analyzed data and inputs these prompts to the foundation LLM 342. LLMs can include multiple interconnected neural network layers. In some embodiments, the prompt generation module 324 generates representative prompts for each domain, probes the foundation LLM 342 to identify relevant expert knowledge. Some embodiments use the enterprise data 318 to determine the topics from the generated embeddings. This information can be used to seed a prompt generator, which can include rewording of statements in the enterprise data.

In some embodiments, expert knowledge is quantitatively defined through a combination of metrics including, for example: (1) consistency of component activation patterns when processing domain-specific queries (e.g., measured as the standard deviation of activation magnitudes), (2) specificity of the component to the target domain (e.g., measured as the ratio of in-domain to out-of-domain activation frequencies), and (3) contribution to output accuracy (e.g., measured through ablation studies). Components are classified as representing expert knowledge when they exceed empirically determined thresholds on at least two of these metrics. New expert knowledge can be identified when component activation patterns differ significantly (e.g., $p<0.05$ using a chi-square test) from existing patterns while maintaining high relevance scores.

The activation pattern analysis module 336 monitors (406) activation patterns within computational components (e.g., neural network layers) of the foundation LLM 342 and identifies (408) a subset of computational components most relevant to the detected context. In some embodiments, the activation pattern analysis module 336 monitors activations of different computational components and calculates relevance scores (sometimes referred to as popularity scores) based on frequency and intensity of activation. The module selects components as candidates for expert models based on their relevance scores. In some embodiments, the activation pattern analysis module 336 determines whether activated components represent new or existing expert knowledge, adds newly identified components to a list of potential expert model components, and increases relevance scores for previously identified components.

In some embodiments, the activation pattern analysis module 336 determines the functional units (e.g., heads) most frequently activated by generated prompts in the foundation LLM 342 and selects units with activation frequencies above a predetermined threshold. In some embodiments, the activation pattern analysis module 336 monitors computational activity in different components of the foundation LLM 342 and tracks frequency and intensity of activations in each component. The identification of relevant functional units (heads) can leverage the inherent structure of these components as established during the original LLM training process, where different heads specialize in processing different types of information and patterns. The system identifies relevant heads by observing which ones consistently activate above threshold levels when processing domain-specific prompts, reflecting the built-in specialization that emerged during the foundation model's training. In some embodiments, the activation pattern analysis module 336 performs deep learning monitoring by tracking the weight values being activated within the LLM during prompt processing. Intensity of activation can be measured by the magnitude of these weight values, where higher numerical values indicate stronger activation and greater utilization of that component. These activation patterns can be mapped across the network to identify regions with consistently high weight activations, indicating areas of the model most relevant to processing domain-specific queries. Some embodiments generate activation maps that visualize areas of high activity within the LLM, for different prompts.

In some embodiments, the activation pattern analysis module 336 calculates relevance scores using a simple linear combination of activation frequency and intensity. For example, the relevance score R for a component could be computed as $R=\alpha F+\beta I$, where F represents the frequency of activation (e.g., percentage of prompts that activate the component), I represents the average intensity or magnitude of activations when the component is active, and $\alpha$ and $\beta$ are weighting coefficients that can be tuned to balance the relative importance of frequency versus intensity in determining component relevance. For example, these coefficients are initially set to 0.6 and 0.4 respectively and adjusted based on model performance. Some embodiments incorporate temporal aspects, such as using a sliding time window that gives more weight to recent activations and gradually ages out older data, allowing the relevance scores to adapt to changing usage patterns over time.

The relevance score calculation can be further refined using statistical measures of activation significance. For example, the frequency component F is calculated as the proportion of domain-specific prompts that activate the component above a baseline threshold of 0.3, while intensity I is measured as the mean activation magnitude normalized to the [0,1] range. The weighting coefficients $\alpha$ and $\beta$ can be determined empirically during model validation, with values of $\alpha=0.6$ and $\beta=0.4$ providing optimal balance between frequency and intensity considerations. These coefficients can be adjusted based on specific enterprise requirements and validation results.

In some embodiments, the activation pattern analysis module 336 calculates relevance scores using techniques adapted from neural network pruning methods. For example, the relevance scores can be based on both the intensity of neuron activations when processing enterprise-specific prompts, as well as the frequency of activation across multiple prompts. Components with consistently low activation magnitudes (e.g., below 0.1) or that rarely activate above a threshold value (e.g., above 0.7 on a normalized scale) can be considered less relevant for the enterprise's domain and receive lower relevance scores, similar to how pruning identifies less important neurons in traditional neural networks. The scoring may also consider redundancy between components, where highly correlated activation patterns between different components may result in lower individual relevance scores since their functionality may be duplicative.

The expert model extraction module 338 extracts (410) the identified subset using model reduction techniques to create specialized expert models 344 with reduced computational requirements when compared to a full LLM (sometimes referred to as a foundation LLM, or a base LLM). In some embodiments, the expert model extraction module 338 creates specialized expert models 344 for each domain and updates these models by comparing new data vectors to existing domain representations.

In some embodiments, the expert model extraction module 338 dynamically creates additional specialized expert models 344 or modifies existing ones based on evolving enterprise needs and query patterns. In some embodiments, the expert model extraction module 338 applies model reduction techniques (e.g., pruning) to remove less frequently activated components, thereby creating smaller, specialized models focused on relevant expert knowledge. In some embodiments, the expert model extraction module 338 uses pruning techniques to reduce the size of the model, where weights or entire neurons below certain activation thresholds are removed from the network while minimizing impact on model performance. This pruning process can target either individual weights, creating a sparse network that maintains the original architecture, or entire nodes/neurons, resulting in a smaller dense network that requires less computational resources. In some embodiments, after pruning, the system implements a fine-tuning phase to restore any lost accuracy, ensuring the reduced model maintains its performance on enterprise-specific tasks while requiring significantly fewer computational resources than the original LLM.

In some embodiments, the model reduction process employs iterative magnitude-based pruning. For example, weights below the $10^{th}$ percentile magnitude within each layer are candidates for removal. After initial pruning, the system can perform targeted fine-tuning using a subset of enterprise data (e.g., 10-20% of the original dataset) to restore accuracy. This process iterates until either the target model size is achieved or accuracy drops below the specified threshold. The system can maintain model coherence by preserving critical attention patterns and key connection pathways identified during activation analysis.

The runtime environment 330 deploys (414) these specialized expert models 344 to handle enterprise-specific queries 320, thereby providing faster query response times and reduced resource usage (when compared to conventional language models) while maintaining threshold accuracy, which may depend on specific use cases. In some embodiments, the runtime environment 330 implements a continuous learning mechanism that routes queries to the foundation LLM 342, compares responses between specialized expert models 344 and the full LLM, and updates the specialized models based on this comparison.

In some embodiments, the runtime environment 330 routes incoming queries 320 to specialized expert models 344 based on detected context and aggregates responses 334 when multiple models are invoked for a single query. When multiple specialized expert models are invoked for a query, the runtime environment 330 can employ similar response aggregation techniques used by the foundation LLM from which the expert models were derived, maintaining consistency with the original model's approach to combining knowledge from multiple domains.

In some embodiments, the runtime environment 330 creates vector representations (e.g., embeddings) for incoming queries 320, compares them to representations characteristic of each specialized expert model 344, routes queries to models with highest representation similarity, and periodically updates the characteristic representations based on successfully processed queries. Vector representations can be created using standard embedding techniques, such as BERT, GPT embeddings, or sentence transformers that convert text into dense numerical vectors, with domain-specific embeddings potentially generated using techniques like doc2vec or customized transformers fine-tuned on enterprise data. These embeddings enable semantic similarity comparisons between incoming queries and the characteristic vector representations of each specialized expert model's domain expertise.

In some embodiments, the runtime environment 330 implements the continuous learning mechanism using either down-sampling and/or confidence-based routing. For example, in the down-sampling approach, every $N^{th}$ query is automatically routed to both the specialized expert model and the full LLM for comparison, where N is a configurable sampling rate (e.g., every $10^{th}$ query). In the confidence-based approach, queries that result in low confidence scores from the specialized model, or queries that fail to sufficiently activate the model's components, are identified as candidates for verification against the full LLM. The responses and activation patterns from these comparative evaluations are then used to assess model performance and trigger updates to the specialized model when needed.

In some embodiments, the runtime environment 330 periodically re-evaluates the relevance and performance of specialized expert models 344, adjusts their deployment, and updates them or creates new ones in response to changes in enterprise data 318 or query patterns. In some embodiments, the runtime environment 330 implements a fallback mechanism to route queries to the foundation LLM 342 when the specialized model's confidence falls below a threshold, when query context does not match any specialized model, or when multiple models are required for a comprehensive response. In some embodiments, the runtime environment 330 identifies multiple relevant specialized expert models 344 for a given context, and the expert model extraction module 338 extracts and combines multiple models when the context requires knowledge from multiple domains. For example, the runtime environment 330 identifies the need for multiple expert models by analyzing the activation patterns in the foundation LLM, where a single query may trigger significant activations across different regions of the network that correspond to different domains of expertise. By observing these concurrent activation patterns, the runtime environment 330 can determine when knowledge from multiple specialized expert models needs to be combined to provide a comprehensive response.

In some embodiments, when combining multiple specialized expert models, the runtime environment 330 uses a weighted ensemble approach. For example, each model's contribution is weighted based on its relevance score for the current query context, calculated using cosine similarity between query embeddings and model domain representations. Conflicts between models are resolved through majority voting for discrete outputs or weighted averaging for continuous values, with weights determined by model confidence scores. The runtime environment 330 maintains consistency by applying cross-model attention mechanisms that allow specialized models to attend to each other's intermediate representations.

In some embodiments, the feedback system 332 collects user feedback on responses 334, aggregates feedback data to assess performance, and provides the aggregated feedback data to improve the foundation LLM 342 in subsequent iterations. In some embodiments, the feedback system 332 implements a continuous learning mechanism that collects user feedback, aggregates the feedback to assess performance, and periodically updates the specialized expert models 344, while providing performance data to improve the foundation LLM 342. For example, the feedback system 332 employs standard user feedback mechanisms, such as binary ratings (like/dislike or agree/disagree) to assess response quality, similar to established approaches used in recommender systems. When consistent negative feedback is received for a particular specialized expert model's responses, this feedback indicates a potential mismatch between the model's expertise and its assigned queries, triggering a reevaluation of the expert model selection and routing process.

In some embodiments, the system 300 implements specific thresholds and parameters for model generation and/or deployment. For relevance scoring, for example, activation values can be normalized to a 0-1 scale, with thresholds typically set at 0.7 for high activation consideration. The continuous learning mechanism can sample every $10^{th}$ query (N=10) for validation against the full LLM, with confidence thresholds (e.g., 0.85) for specialized model responses. Vector embeddings can be generated using 768-dimensional representations, with similarity routing thresholds (e.g., 0.75) for model selection. Model pruning can retain weights with magnitude greater than a threshold (e.g., 0.1 of the layer's maximum value), with post-pruning fine-tuning limited to a predetermined number of steps (e.g., 1,000 steps) to maintain efficiency while preserving accuracy. Response aggregation from models can use weighted averaging based on model confidence scores, with weights normalized across contributing models.

Threshold accuracy levels can be determined during an initial validation phase by comparing specialized model outputs with the foundation LLM on a test set of enterprise queries. The threshold can be set as a configurable percentage (e.g., 95%) of the foundation LLM's accuracy score, measured using metrics, such as exact match rate, semantic similarity scores (using techniques like BLEU or ROUGE), and/or task-specific metrics like F1 scores for classification tasks. This threshold can be adjusted based on enterprise requirements, with different thresholds possible for different domains or use cases.

In this way, the method 400 significantly improves processing efficiency and reduces latency in enterprise AI deployments by dynamically generating and managing specialized expert models. By analyzing enterprise data patterns, monitoring LLM activation patterns, and extracting only the most relevant computational components, the system creates smaller, more focused models that require fewer resources while maintaining accuracy for domain-specific tasks. The continuous learning mechanism ensures these specialized models adapt to changing enterprise needs and usage patterns over time, while the feedback system enables ongoing optimization of both the specialized models and the foundation LLM. This approach provides a more efficient alternative to using full-sized LLMs while reducing the likelihood of hallucinations through targeted specialization.

The numerical examples mentioned with reference to FIG. 4 are provided solely for illustrative purposes, and not intended to be exhaustive or to limit the scope of the inventions to the precise examples disclosed. Many modifications and variations of the example numbers are possible in view of the above teachings. Similarly, various specific examples of techniques (e.g., deep learning models) mentioned with reference to FIG. 4 are provided solely for illustrative purposes, and not intended to be exhaustive or to limit the scope of the inventions to the precise examples disclosed. Many modifications and variations of the example techniques are possible in view of the above teachings.

Figure 5:
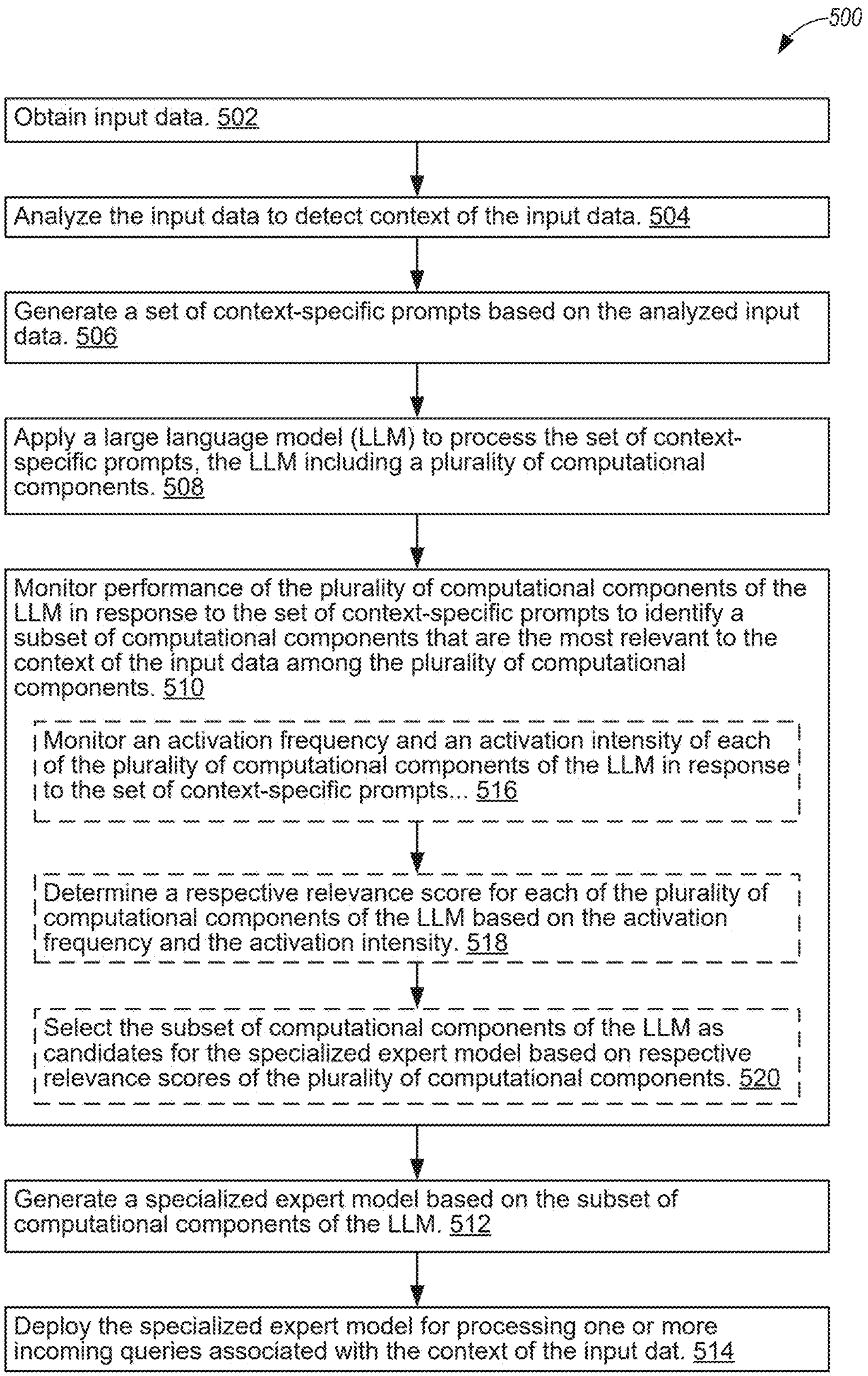
FIG. 5 is a flowchart of another example method for generating and deploying computationally efficient specialized expert models for enterprise use, according to some embodiments.

FIG. 5 is a flowchart of another example method 500 for generating and deploying computationally efficient specialized expert models for enterprise use, according to some embodiments. For convenience, the method 500 is described as being implemented by a computing system 300. The computing device 300, through its processor(s) 302 and memory 312, executes a method that reduces video data storage and improves processing efficiency. Method 500 is, optionally, governed by instructions that are stored in a non-transitory computer readable storage medium and that are executed by one or more processors of the computing system. Each of the operations shown in FIG. 5 may correspond to instructions stored in a computer memory or non-transitory computer readable storage medium (e.g., memory 312 in FIG. 3). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 500 may be combined and/or the order of some operations may be changed.

The computing system 300 obtains (operation 502) input data (e.g., enterprise data 106), analyzes (operation 504) the input data to detect context of the input data, and generates (operation 506) a set of context-specific prompts based on the analyzed input data. A large language model (LLM 128) is applied (operation 508) to process the set of context-specific prompts, the LLM 128 including a plurality of computational components. The computing system 300 monitors (operation 510) performance of the plurality of computational components of the LLM 128 in response to the set of context-specific prompts to identify a subset of computational components that are the most relevant to the context of the input data among the plurality of computational components. The computing system 300 generates (operation 512) a specialized expert model 124 based on the subset of computational components of the LLM 128 and deploys (operation 514) the specialized expert model 124 for processing one or more incoming queries 108 associated with the context of the input data. The deployed specialized expert model 124 provides faster query response times and reduced computational resource usage compared to the full pre-trained LLM 128 while maintaining a threshold level of accuracy for the enterprise-specific context.

In some embodiments, when the computing system 300 monitors performance of the plurality of computational components of the LLM 128, the computing system 300 monitors (operation 516) an activation frequency and an activation intensity of each of the plurality of computational components of the LLM 128 in response to the set of context-specific prompts, determines (operation 518) a respective relevance score for each of the plurality of computational components of the LLM 128 based on the activation frequency and the activation intensity, and selects (operation 520) the subset of computational components of the LLM 128 as candidates for the specialized expert model 124 based on respective relevance scores of the plurality of computational components.

In some embodiments, for each of the subset of computational components, the computing system 300 determines whether the respective computational component belongs to a list of potential expert model 124 components. In some situations, in accordance with a determination that the respective computational component does not belong to the list of known expert model 124 components, the computing system 300 adds the respective computational component to a list of potential expert model 124 components. Conversely, in some situations, in accordance with a determination that the respective computational component belongs to the list of known expert model 124 components, the computing system 300 increases a respective relevance score of the respective computational component.

In some embodiments, the one or more incoming queries 108 include a first query, and a continuous learning mechanism is applied. The computing system 300 routing the first query to the plurality of computational components of the LLM 128 to generate a first response and to the specialized expert model 124 to generate a second response. The first response and the second response are compared to generate a comparison result. The computing system 300 updates the specialized expert model 124 based on the comparison result.

In some embodiments, the specialized expert model 124 includes a plurality of expert models each corresponding to a respective context. The computing system 300 detects query context of one of the one or more incoming queries 108, routes the one of the one or more incoming queries 108 to the plurality of expert models based on the query context to generate a plurality of responses, and aggregates the plurality of responses to generate a context-based response to the one of the one or more incoming queries 108.

In some embodiments, the computing system 300 applies the specialized expert model 124 to generate one or more responses based on the one or more incoming queries 108, collects user feedback on the one or more responses, and assesses performance of the specialized expert model 124 based on the user feedback. In accordance with assessing the performance of the specialized expert model 124, the computing system 300 modifies a foundation LLM 128 including the specialized expert model 124, e.g., one or more subsequent iterations.

In some embodiments, the computing system 300 analyzes the input data by creating a plurality of vector representations of the input data, e.g., using an embedding technique, and associating the plurality of vector representations with the context of the input data.

In some embodiments, the computing system 300 applies a pre-trained embedding model to create a plurality of vector representations based on the input data and clusters the plurality of vector representations to identify one or more distinct knowledge domains within the input data. For each identified knowledge domain, a set of representative prompts are generated based on clustering of the plurality of vector representations. The computing system 300 applies the LLM 128 to process the set of representative prompts and identify expert information of each of the one or more distinct knowledge domains for generating the specialized expert model 124. The computing system 300 further obtains a set of new data vector representations and compares the set of new data vector representations and the plurality of vector representations to update the specialized expert model 124.

In some embodiments, the specialized expert model 124 includes a plurality of expert models each corresponding to a respective characteristic representation. The computing system 300 generates a query vector representation for a first incoming query, compares the query vector representation to respective characteristic representations of the plurality of expert models to identify one of the plurality of expert models having a highest similarity level, and applies the one of the plurality of expert models to process the first incoming query. Based on processing of the first incoming query, the computing system 300 updates the respective characteristic representation of the one of the plurality of expert models.

In some embodiments, the performance of the plurality of computational components of the LLM 128 are monitored periodically. The computing system 300 detects at least one of a change in the input data or a query pattern, and in response to the at least one of the change and the query pattern, updates the specialized expert model 124 or creating a new model.

In some embodiments, the computing system 300 detects a user request or a query pattern. In response to the user request or the query pattern, the computing system 300 dynamically creates one or more additional expert models or modifying the specialized expert model 124.

In some embodiments, the computing system 300 generates the specialized expert model 124 based on the subset of computational components by removing a set of remainder computational components of the LLM 128 that are less frequently activated than the subset of computational components. By these means, the computing system 300 creates a smaller, specialized model focused on relevant expert knowledge.

In some embodiments, the computing system 300 determines that (i) a confidence score of a query response generated by the specialized expert model 124 in response to the one or more incoming queries 108 is below a confidence threshold, (ii) a context of the one or more incoming queries 108 does not match the context of the input data associated with the specialized expert model 124, or (iii) at least one supplemental expert model 124 is required in addition to the specialized expert model 124 to provide a comprehensive response. A fallback mechanism is implemented to route the one or more incoming queries 108 to the LLM 128 including the plurality of computational components.

In some embodiments, the specialized expert model 124 includes a plurality of expert models each corresponding to a respective characteristic representation. The computing system 300 generates a query vector representation for a first incoming query, compares the query vector representation to respective characteristic representations of the plurality of expert models to identify one of the plurality of expert models having a highest similarity level, and applies the one of the plurality of expert models to process the first incoming query;

In some embodiments, the specialized expert model 124 includes a plurality of expert models associated with the context of the input data. The computing system 300 identifies the plurality of expert models for the context of the input data, in accordance with a determination that the context of the input data corresponds to a plurality of knowledge domains, combines the plurality of expert models.

In some embodiments, the LLM 128 is pre-trained. The computing system 300 identifies the subset of the LLM 128 by determining that the subset of computational components of the LLM 128 is more frequently activated in response to the set of context-specific prompts than a remainder of the plurality of computational components or determining that each of the subset of computational components has an activation frequency above a predetermined threshold.

In some embodiments, the computing system 300 implements a continuous learning mechanism to (i) collect user feedback on responses provided by the specialized expert model 124; (ii) aggregate the user feedback to assess performance of the specialized expert model 124; (iii) periodically update the specialized expert model 124 based on the user feedback that is aggregated; and (iv) provide performance data to improve the LLM 128 in a subsequent iteration.

In some embodiments, when the computing system 300 monitors performance of the plurality of computational components of the LLM 128, the computing system 300 monitors computational activities including activation patterns in the plurality of computational components of the LLM 128 and tracks an activation frequency and an activation intensity of each of the plurality of computational components.

It should be understood that the particular order in which the operations in FIG. 5 have been described are merely exemplary and are not intended to indicate that the described order is the only order in which the operations could be performed. One of ordinary skill in the art would recognize various ways to select and load AI models. Additionally, it should be noted that details of other processes described above with respect to FIGS. 1-4 are also applicable in an analogous manner to method 500 described above with respect to FIG. 5. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Additionally, the foregoing description, for purpose of explanation, has been described with reference to specific numerical examples (e.g., associated with performance metrics, resource utilization efficiency, and/or task-specific requirements). However, the illustrative discussions above are not intended to be exhaustive or to limit the scope of the claims to the precise numerical examples disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A computer-implemented method for providing expert models, comprising:
- at a computing system including one or more processors and memory:
  - obtaining input data;
  - creating a plurality of vector representations based on the input data;
  - analyzing the plurality of vector representations to detect context of the input data;
  - generating a set of context-specific prompts based on the plurality of vector representations;
  - applying a large language model (LLM) to process the set of context-specific prompts, the LLM including a plurality of computational components;
  - monitoring performance of the plurality of computational components of the LLM in response to the set of context-specific prompts to identify a subset of computational components that are the most relevant to the context of the input data among the plurality of computational components;
  - generating a specialized expert model based on the subset of computational components of the LLM;
  - obtaining a set of new data vector representations;
  - comparing the set of new data vector representations and the plurality of vector representations to update the specialized expert model; and
  - deploying the specialized expert model for processing one or more incoming queries associated with the context of the input data.

2. The method of claim 1, wherein monitoring the performance of the plurality of computational components of the LLM further comprises:
- monitoring an activation frequency and an activation intensity of each of the plurality of computational components of the LLM in response to the set of context-specific prompts;
- determining a respective relevance score for each of the plurality of computational components of the LLM based on the activation frequency and the activation intensity; and
- selecting the subset of computational components of the LLM as candidates for the specialized expert model based on respective relevance scores of the plurality of computational components.

3. The method of claim 1, wherein identifying the subset of computational components of the LLM comprises, for each respective computational component of the subset of computational components:

determining whether the respective computational component belongs to a list of potential known expert model components; and implementing one of (1) in accordance with a determination that the respective computational component does not belong to the list of known expert model components, adding the respective computational component to a list of potential expert model components and (2) in accordance with a determination that the respective computational component belongs to the list of known expert model components, increasing a respective relevance score of the respective computational component.

4. The method of claim 1, wherein the one or more incoming queries include a first query, the method further comprising:

routing the first query to the plurality of computational components of the LLM to generate a first response;

routing the first query to the specialized expert model to generate a second response;

comparing the first response and the second response to generate a comparison result; and updating the specialized expert model based on the comparison result.

5. The method of claim 1, wherein the specialized expert model includes a plurality of expert models each corresponding to a respective context, the method further comprising:

detecting query context of one of the one or more incoming queries;

routing the one of the one or more incoming queries to the plurality of expert models based on the query context to generate a plurality of responses; and aggregating the plurality of responses to generate a context-based response to the one of the one or more incoming queries.

6. The method of claim 1, further comprising:

applying the specialized expert model to generate one or more responses based on the one or more incoming queries;

collecting user feedback on the one or more responses;

assessing performance of the specialized expert model based on the user feedback; and in accordance with assessing the performance of the specialized expert model, modifying the specialized expert model.

7. The method of claim 1, wherein analyzing the input data further comprises:

associating the plurality of vector representations with the context of the input data.

8. The method of claim 1, further comprising:

applying a pre-trained embedding model to create the plurality of vector representations based on the input data;

clustering the plurality of vector representations to identify one or more distinct knowledge domains within the input data;

for each identified knowledge domain, generating a set of representative prompts based on clustering of the plurality of vector representations; and applying the LLM to process the set of representative prompts and identify expert information of each of the one or more distinct knowledge domains for generating the specialized expert model.

9. The method of claim 1, wherein the specialized expert model includes a plurality of expert models each corresponding to a respective characteristic representation, the method further comprising:

generating a query vector representation for a first incoming query;

comparing the query vector representation to respective characteristic representations of the plurality of expert models to identify one of the plurality of expert models having a highest similarity level;

applying the one of the plurality of expert models to process the first incoming query; and based on processing of the first incoming query, updating the respective characteristic representation of the one of the plurality of expert models.

10. The method of claim 1, wherein the performance of the plurality of computational components of the LLM are monitored periodically, the method further comprising:

detecting a change in the input data or a query pattern; and in response to detecting the change in the input data or detecting the query pattern, updating the specialized expert model or creating a new model.

11. A computing system for reducing video data storage and improving processing efficiency, the computing system comprising:

one or more processors; and memory storing one or more programs configured for execution by the one or more processors, the one or more programs comprising instructions for:

obtaining input data;

creating a plurality of vector representations based on the input data;

analyzing the plurality of vector representations to detect context of the input data;

generating a set of context-specific prompts based on the plurality of vector representations;

applying a large language model (LLM) to process the set of context-specific prompts, the LLM including a plurality of computational components;

monitoring performance of the plurality of computational components of the LLM in response to the set of context-specific prompts to identify a subset of computational components that are the most relevant to the context of the input data among the plurality of computational components;

generating a specialized expert model based on the subset of computational components of the LLM;

obtaining a set of new data vector representations;

comparing the set of new data vector representations and the plurality of vector representations to update the specialized expert model; and deploying the specialized expert model for processing one or more incoming queries associated with the context of the input data.

12. The computing system of claim 11, the one or more programs further comprising instructions for:

detecting a user request or a query pattern; and in response to the user request or the query pattern, dynamically creating one or more additional expert models or modifying the specialized expert model.

13. The computing system of claim 11, wherein the instructions for generating the specialized expert model based on the subset of computational components further comprises instructions for:

removing a set of remainder computational components of the LLM that are less frequently activated than the subset of computational components.

14. The computing system of claim 11, the one or more programs further comprising instructions for:

in accordance with a determination that (i) a confidence score of a query response generated by the specialized expert model in response to the one or more incoming queries is below a confidence threshold, (ii) a context of the one or more incoming queries does not match the context of the input data associated with the specialized expert model, or (iii) at least one supplemental expert model is required in addition to the specialized expert model to provide a comprehensive response, implementing a fallback mechanism to route the one or more incoming queries to the LLM including the plurality of computational components.

15. The computing system of claim 11, wherein the specialized expert model includes a plurality of expert models each corresponding to a respective characteristic representation, the one or more programs further comprising instructions for:

generating a query vector representation for a first incoming query;

comparing the query vector representation to respective characteristic representations of the plurality of expert models to identify one of the plurality of expert models having a highest similarity level; and applying the one of the plurality of expert models to process the first incoming query.

16. A non-transitory computer-readable storage medium storing one or more programs configured for execution by one or more processors of a computing system, the one or more programs comprising instructions for:

obtaining input data;

creating a plurality of vector representations based on the input data;

analyzing the plurality of vector representations to detect context of the input data;

generating a set of context-specific prompts based on the plurality of vector representations;

applying a large language model (LLM) to process the set of context-specific prompts, the LLM including a plurality of computational components;

monitoring performance of the plurality of computational components of the LLM in response to the set of context-specific prompts to identify a subset of computational components that are the most relevant to the context of the input data among the plurality of computational components;

generating a specialized expert model based on the subset of computational components of the LLM;

obtaining a set of new data vector representations;

comparing the set of new data vector representations and the plurality of vector representations to update the specialized expert model; and deploying the specialized expert model for processing one or more incoming queries associated with the context of the input data.

17. The non-transitory computer-readable storage medium of claim 16, wherein the specialized expert model includes a plurality of expert models associated with the context of the input data, the one or more programs further comprising instructions for:

identifying the plurality of expert models for the context of the input data; and in accordance with a determination that the context of the input data corresponds to a plurality of knowledge domains, combining the plurality of expert models.

18. The non-transitory computer-readable storage medium of claim 16, wherein the LLM is pre-trained, and the instructions for identifying the subset of the LLM further comprises instructions for:

determining that the subset of computational components of the LLM is more frequently activated in response to the set of context-specific prompts than a remainder of the plurality of computational components; or determining that each of the subset of computational components has an activation frequency above a predetermined threshold.

19. The non-transitory computer-readable storage medium of claim 16, the one or more programs further comprising instructions for implementing a continuous learning mechanism to (i) collect user feedback on responses provided by the specialized expert model; (ii) aggregate the user feedback to assess performance of the specialized expert model; (iii) periodically update the specialized expert model based on the user feedback that is aggregated; and (iv) provide performance data to improve the LLM in a subsequent iteration.

20. The non-transitory computer-readable storage medium of claim 16, wherein the instructions for monitoring performance of the plurality of computational components of the LLM further comprises instructions for:

monitoring computational activities including activation patterns in the plurality of computational components of the LLM; and tracking an activation frequency and an activation intensity of each of the plurality of computational components.

* * * * *